A. E. CARLTON.
ANTISKID DEVICE.
APPLICATION FILED NOV. 27, 1917.

1,285,033.

Patented Nov. 19, 1918.

WITNESS:

INVENTOR,
Anson E. Carlton,
ATTORNEY.

UNITED STATES PATENT OFFICE.

ANSON E. CARLTON, OF PATERSON, NEW JERSEY.

ANTISKID DEVICE.

1,285,033.   Specification of Letters Patent.   Patented Nov. 19, 1918.

Application filed November 27, 1917. Serial No. 204,153.

*To all whom it may concern:*

Be it known that I, ANSON E. CARLTON, a citizen of the United States, residing at Paterson, in the county of Passaic and State of New Jersey, have invented certain new and useful Improvements in Antiskid Devices, of which the following is a specification.

This invention is an improvement in antiskid devices for wheels. The object is to provide an anti-skid device which can be readily applied and removed and will be inexpensive in construction and especially adapted, in respect to strength and durability, for wheels of trucks and other heavy-load vehicles.

$a$ indicates the felly, $b$ the metal rim and $c$ the solid rubber tire of a wheel.

Figure 1:
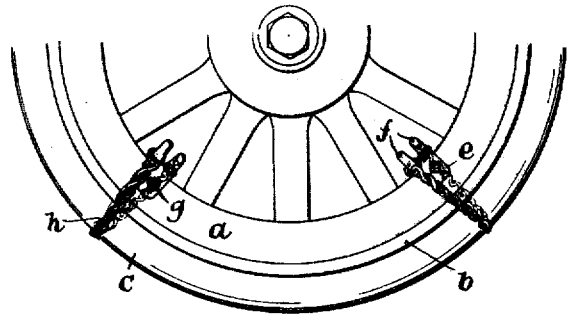
Figure 1 is a fragmentary side elevation of a wheel having the improved anti-skid devices.
Figure 2:
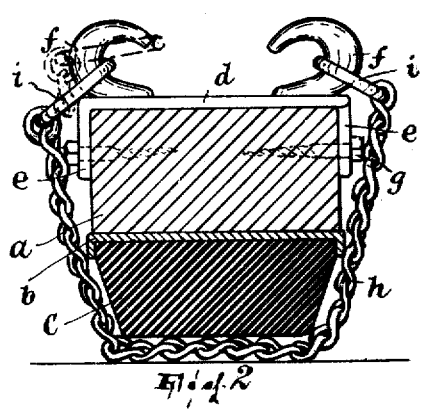
Fig. 2 is a transverse section of the wheel, showing one of the devices in front elevation.
Figure 3:
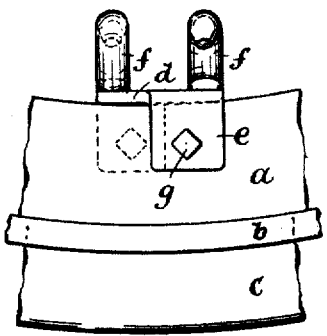
Fig. 3 is a side elevation of a part of the wheel of the plate member of the device in place thereon.
Figure 4:
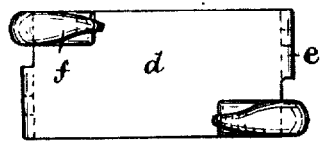
Fig. 4 is a plan of said member.

To form the plate member of my device I take a plate of stout metal and bend up the ends thus to produce a rectangular body portion $d$ and upstanding wings or cheeks $e$ $e$. On the plate member, preferably its body portion $d$, is the means to which to attach the chain or equivalent flexible traction member, the same in the present instance taking the form of two reverse hooks $f$ welded to said body portion. Said plate member, which is fitted over the inner periphery of the felly as shown in Figs. 2 and 3, is secured to the felly by screws or equivalent means, as the lag-screws $g$. $h$ is the chain, which passes around the felly and tire and has at its ends suitable rings $i$ or equivalent to engage the hooks $f$.

In edgewise elevation the aforesaid plate member conforms to the contour of the section of the inner peripheral portion of the felly, and when it is secured in place its body portion bears against said inner peripheral face, while its wings or cheeks bear against the side faces, of the felly. This is an important factor of my invention for thereby the strain of the chain is assumed by the substantial interlock between the plate member and felly thus afforded rather than by the securing devices $g$; and the interlock will be most effective if, as shown, the contour of the adjoining surfaces of the felly and plate is rectangular.

The devices $f$ are arranged one at each of two diagonal corners of the body portion $d$ of the plate member so that the chain connecting them will extend obliquely across the face of the tire, which tends to reduce its freedom of movement and the incidental noise. A further advantage of this arrangement is that it facilitates welding the hooks (where they are formed separately from the plate member and then attached thereto) in place. The wings or cheeks $e$ are much narrower than the body portion $d$ of the plate and project from the two diagonal corners of said body portion not occupied by the hooks, so that clear access is afforded for the clamping tool when the hooks are welded on.

Preferably the screws $g$ are set out of opposition to each other, as shown so that if it is necessary for them to be long enough to do so they may overlap.

The chain is of just such length that when one ring $i$ has been attached to one hook the other will barely clear the point of the other hook. In use the chain will thus be kept in place without possibility of detachment at either end; nevertheless it can be readily removed or replaced.

Having thus fully described my invention, what I claim as new and desire to secure by Letters Patent is:—

In combination, with the felly and tire of a wheel, a plate member including a substantially rectangular body portion bearing against the inner periphery of the felly and upstanding cheeks at two diagonal corners of said body portion arranged offset with respect to each other and bearing against the side faces of the felly, said body portion having at its other two diagonal corners separate chain-attaching means, and a chain extending around the tire transversely thereof and having its ends connected to said means.

In testimony whereof I affix my signature.

ANSON E. CARLTON.